United States Patent [19]

Schmeidl

[11] 3,849,065
[45] Nov. 19, 1974

[54] RHODAMINE DYE SOLUTIONS

[75] Inventor: Karl Schmeidl, Frankenthal, Germany

[73] Assignee: Badische Anilin and Soda-Fabrik Aktiengesellschaft, Ludwigshafen/Rhein, Germany

[22] Filed: July 24, 1972

[21] Appl. No.: 274,580

[52] U.S. Cl.............................. 8/25, 8/7, 260/336
[51] Int. Cl. ...................... D06p 1/42, C09b 11/28
[58] Field of Search ...................... 8/7, 25; 260/336

[56] References Cited
UNITED STATES PATENTS

| | | | |
|---|---|---|---|
| 516,584 | 3/1894 | Bernthsen | 260/336 |
| 3,107,968 | 10/1963 | Pascal | 8/55 |
| 3,346,322 | 10/1967 | Finkenauer et al. | 8/79 |
| 3,503,699 | 3/1970 | Wellenreuther et al. | 8/93 |

OTHER PUBLICATIONS

Colour Index, 2nd ed., 1956, Vol. 3, pp. 3384 and 3385.

*Primary Examiner*—Thomas J. Herbert, Jr.
*Assistant Examiner*—Bruce H. Hess
*Attorney, Agent, or Firm*—Johnston, Root, O'Keefe, Keil, Thompson & Shurtleff

[57] ABSTRACT

Stable concentrated rhodamine dye solutions containing one or more rhodamine dyes esterified with a glycol or glycol derivative. The solutions are particularly suitable for dyeing paper.

2 Claims, No Drawings

RHODAMINE DYE SOLUTIONS

The invention relates to stable highly concentrated solutions of esterified rhodamine dyes of the formulae (A) and/or (B):

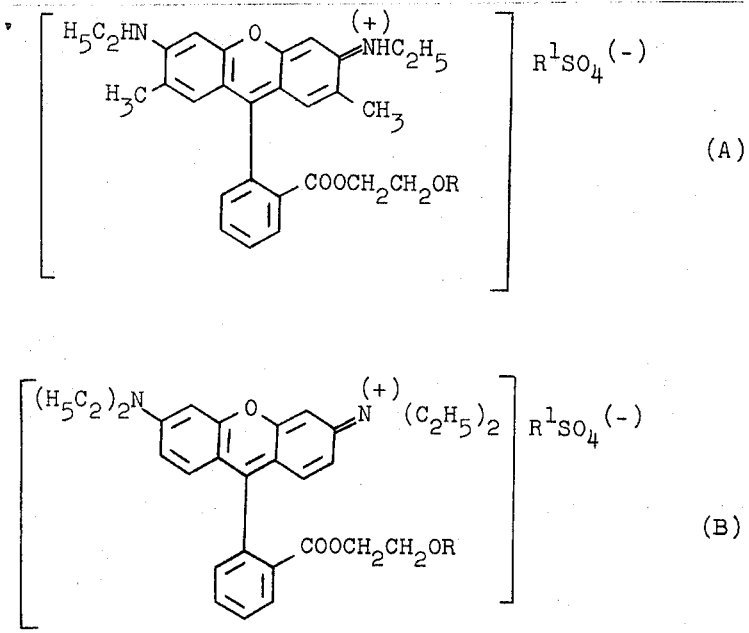

in which R is hydrogen, acetyl, propionyl, alkyl of one to four carbon atoms or a radical of the formula $(CH_2CH_2O)_nR^2$ (in which $n$ is the integer 1 or 2);

$R^1$ is hydrogen, methyl or ethyl; and $R^2$ is hydrogen, acetyl, propionyl or alkyl of one to four carbon atoms.

Examples of alkyl radicals R and $R^2$ are methyl, ethyl, propyl or butyl.

R and $R^1$ are preferably hydrogen and n is preferably 1.

Diethylene glycol, triethylene glycol and the corresponding monomethyl, monoethyl, monopropyl and monobutyl ethers, glycol acetate and glycol propionate are compounds of the formula $HOCH_2CH_2OR$. Examples of ethers are ethylene glycol mono-n-butyl ether, diethylene glycol mono-n-butyl ether and diethylene glycol monomethyl ether.

For the prepration of solutions according to the invention, the dye (A) and/or (B) with R being methyl or ethyl may be dissolved or suspended in a compound of the formula $HO\text{-}CH_2CH_2O\text{-}R$ and the mixture heated to a temperature within the range from about 100° to 200°C, preferably from 120° to 170°C. The methanol or ethanol liberated by the transesterification is distilled off, as well as the major portion of any water contained in the components of the mixture depending on the temperature.

Ethylene carbonate and glycol diacetate, which may be converted into glycols, may be used as solvents.

Examples of preferred compounds of the formula $HO\text{-}CH_2CH_2O\text{-}R$ are ethylene glycol, diethylene glycol and triethylene glycol.

Preferred methods for the production of solutions according to the invention consist in alkylating the dye bases of the formulae:

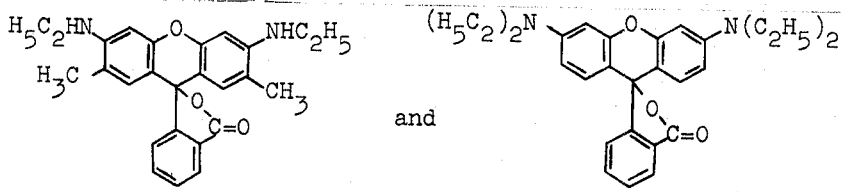

and (on which the dyes (A) and/or (B) are based) with dimethyl or diethyl sulfate in the polyhydric glycol and/or glycol ether and then effecting transesterification of the resultant mixture by heating it to the said temperatures, or in transesterifying the dye bases with and in compounds of the formula $HO\text{-}CH_2CH_2O\text{-}R$ in the presence of sulfuric acid.

It is apparently sufficient for the production of stable solutions for only partial transesterification to take place. Advantageous degrees of transesterification lie within the range from 20 to 70 percent. No details of the reactions which take place are known. The degree of transesterification may be ascertained by determination of the proportion of alkanol contained in the distillate.

In esterification of the dye base in the presence of sulfuric acid it is advantageous to use 1.01 to about 1.3 moles, preferably from 1.03 to 1.08 moles, of sulfuric acid per mol of dye base. Esterification temperatures of from 120° to 180°C, preferably from 140° to 160°C, are advantageous; usually the reaction is over after from one hour to six hours. The moist or dry dye base may be used for esterification, and water liberated in the esterification or already present and also readily volatile compounds are distilled off as far as possible. The degree of esterification in the solutions may be further increased after esterification equilibrium has been set up, for example by adding glycol diacetate in order to bind further water still present which would react with glycol diacetate to form acetic acid and glycol acetate. The presence of small amounts of acetic acid or propionic acid in the solutions according to the invention is favorable.

In addition to the constituents already specified, the solutions according to the invention may contain small amounts, for example up to 10 percent, of additional solvents, for example alcohols such as ethanol, propanol or butanol; ketones such as acetone or methyl ethyl ketone; amides such as formamide, dimethylformamide or N-methylpyrrolidone or butyrolactone. Solutions of other basic dyes, for example from the acridine series or the triphenylmethane series, may also be added to the solutions according to the invention for shading.

It is advantageous for the stability of the highly concentrated solutions according to the invention that they should not contain more than 5 percent of water; this applies especially to solutions of the dye (A) and mixtures in which dye (A) is present in an amount of more than 20 percent based on the total content of dye.

The relative proportions of the components are conveniently chosen so that the finished solutions contain about 20 to 60 percent of dye based on the total weight. The amount of dye can be determined by absorbance measurement or dyeing and comparing the values obtained with a standard (for example a commercial type of the powdered dye.)

Solutions containing the dyes (A) and (B) in the ratio from 40:60 to 60:40 are particularly valuable for industrial paper coloring because of the shades which can be achieved with them. Solutions of the dyes (A) are moreover interesting for the production of printing inks.

The following Examples illustrate the invention. The parts and percentages in the following Examples are by weight unless otherwise stated.

EXAMPLE 1

100 parts of 3,6-bisethylamino-2,7-dimethylfluoran is introduced into a mixture of 50 parts of diethylene glycol monomethyl ether and 30 parts of dimethyl sulfate and heated to 100°C. After about half an hour 3 parts of dimethyl sulfate is added and after another half an hour 50 parts of triethylene glycol. The whole is then heated for another 4 hours at 170°C. The vapor passing over is condensed and collected in a separator. Finally another 75 parts of triethylene glycol is added, the whole is allowed to cool, filtered and a dye solution is thus obtained which remains stable when stored in the cold and in the heat. 235 parts of this solution are equivalent in coloring paper to 100 parts of the dye powder Rhodamine F4G (Commercial type, C.I. 45,160/methyl ester).

The distillate passing over is 35 parts; it contains 29 percent of methanol. This is equivalent to a transesterification degree of about 60 percent.

A similar solution is obtained when the 50 parts of diethylene glycol monomethyl ether is replaced by 50 parts of ethylene glycol.

EXAMPLE 2

55.5 parts of Rhodamine base B (C.I. 45,170 B) and 44.5 parts of 3,6-bisethylamino-2,7-dimethylfluoran are introduced into a mixture of 50 parts of diethylene glycol monomethyl ether and 28 parts of dimethyl sulfate and heated to 90°C. Forty-five minutes later 2.5 parts of dimethyl sulfate is added followed by another 2.5 parts after another twenty minutes. The mixture is kept for half an hour at 90° to 100°C and then 90 parts of triethylene glycol is added. The temperature is then raised to 135°C and kept at this level for 4 hours. The distillate obtained consists of 5 parts and contains 84 percent of methanol. This is equivalent to a degree of transesterification of 25 percent.

When heating is carried on for four hours at 143° or 170°C, 12 or 16 parts of distillate is obtained having a methanol content of 34 percent or 42.8 percent corresponding to a degree of transesterification of about 25 percent or 41 percent.

The dye solutions thus obtained are somewhat yellower than Rhodamine B (C.I. 45,170) and color paper from an aqueous liquor, the color strength as compared with powder being 200:100.

EXAMPLE 3

136 parts of moist Rhodamine base B (C.I. 45,170 B) containing 36 parts of water is introduced into 90 parts of glycol and while stirring 26.2 parts of 91.1 percent sulfuric acid is added. The whole is heated gradually to 150°C and the volatile constituents (about 50 parts) are distilled off. After heating for 4 hours at 150° to 155°C, 15 parts of a mixture consisting of 45 percent of glycol diacetate, 40 percent of glycol monoacetate and 15 percent of glycol is added. The whole is kept at the said temperature for another two hours, allowed to cool and filtered.

The total weight of the dye solution is brought to 237 parts by adding another 20 parts of the said mixture of glycol and glycol esters. The water content of the solution is 2 percent. Instead of the mixture, other solvents such as acetic acid, propionic acid, dimethylformamide or pyrrolidone may be used.

200 parts of the stable solution thus prepared is equivalent in color strength to 100 parts of a comparable powdered dye (Rhodamine F3B) but the purity of shade is better and the tone more yellowish.

EXAMPLE 4

90.7 parts of Rhodamine base B (C.I. 45,170 B), containing 32.7 parts of water, and 73.8 parts of the moist compound of the formula:

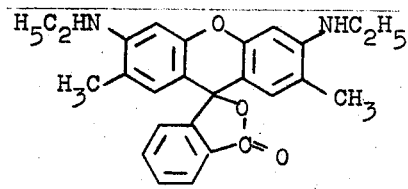

containing 31.8 parts of water are stirred into 100 parts of glycol and then 25.5 parts of 93.6 percent sulfuric acid is added. The whole is heated at 152°C while stirring and the volatile constituents are distilled off. After heating for about four hours at 150° to 155°C 27.5 parts of the mixture of glycol and glycol esters specified in Example 3 is introduced. The whole is then heated for another two hours, cooled and filtered. The solution thus obtained has a water content of 2.3 percent. By adding 20 parts of acetic acid and 7 parts of glycol 260 parts of a solution is obtained which is stable in storage. 145 parts thereof is equivalent in color strength, shade and purity to 100 parts of Rhodamin B powder (C.I. 45,170) in the mass coloring of paper. Ethyl glycol acetate may also be used instead of the mixture of glycol and glycol esters.

EXAMPLE 5

176.6 parts of the moist compound having the formula indicated in Example 4 and containing 76.6 parts of water is introduced with stirring into 150 parts of glycol and then 27.4 parts of 91.1 percent sulfuric acid is introduced. The temperature is then raised to 150°C while stirring and the volatile constituents (in all about 100 parts) are distilled off. After heating for four hours at 150°C 27.5 parts of the mixture of glycol esters specified in Example 3 is added and the whole is heated for another two hours at 150°C and then cooled. 281 parts of a dye solution having a water content of 7.4 parts and a content of free sulfuric acid of 1.5 parts is obtained.

29 parts of a solvent, for example glycol, acetic acid, formic acid, propylene carbonate, butyrolactone, ethyl glycol or the mixture of glycol and glycol esters specified in Example 3 is added. 310 parts of a dye solution is obtained. 290 parts of this solution is equivalent to 100 parts of a comparable powdered product.

When 1.5 parts of Euchrysin GGNX Base (C.I. 46,040 Base) and 54.5 parts of the mixture of glycol and glycol esters specified in Example 3 are added to the 281 parts of dye solution obtained above, 300 parts of the solution thus obtained is equivalent to 100 parts of Rhodamine 6 GDN extra powder with the same purity of shade and a somewhat more yellowish tone.

The content of free sulfuric acid may be lowered for example by adding Rhodamine 6G methyl ester bicarbonate (3,6-bisethylamino 2,7-dimethyl-9-(2'-carbomethoxyphenyl)-xanthylium bicarbonate) or by ammonium carbonate.

When the reaction is carried out at 170°C instead of at 150°C, a larger amount of distillate and a daye having a more bluish shade is obtained.

EXAMPLE 6

10 parts of Rhodamine base B is introduced into 13 parts of glycol and while stirring 2.6 parts of 91.1 percent sulfuric acid is added. The temperature is then raised to 140°C and maintained for five hours. The volatile constituents are distilled off. The whole is allowed to cool, filtered and 24.4 parts of a stable solution is obtained. It contains 0.76 part of water and 0.3 part of free sulfuric acid.

206 parts of this solution is equivalent to 100 parts of Rhodamine F3B powder (C.I. 45,175) but has a clearly more yellowish shade and better purity of shade of color.

EXAMPLE 7

17.55 parts of moist Rhodamine Base B containing 7.55 parts of water is introduced into 10 parts of glycol and then 2.25 parts of 93 percent sulfuric acid is added and the whole is heated to 140°C. The volatile constituents are distilled off in this way. After the mixture has been stirred for about half an hour at 140°C, another 0.78 part of 93 percent sulfuric acid is added and stirring is continued for another 4 hours at the same temperature. The amount of distillate is 8.8 parts. 23.65 parts of solution having a water content of 5.5 percent is obtained.

200 parts of this solution is equivalent in color strength to 100 parts of the powdered dye Rhodamine F3B; the shade of color is clearly more yellow and the purity is better.

A similar solution is obtained by using 9 parts of glycol and 261 parts of a 91 percent sulfuric acid and raising the temperature to 155°C. 19.93 parts of a dye solution is thus obtained of which 200 parts after dilution with 3.67 parts of acetic acid, propionic acid or butanol is equivalent in color strength to 100 parts of powdered Rhodamine F3B.

EXAMPLE 8

8.8 parts of moist Rhodamine Base B, containing 5.8 parts of dry base, and 7.25 parts of the moist compound of the formula indicated in Example 4 are introduced into 10 parts of glycol, 2.63 parts of 91.1 percent sulfuric acid is added and the whole is heated for 5 hours at 150°C. 8.5 parts thus distill off and 20.2 parts of a concentrated dye solution remains which is diluted with 5.8 parts of acetic acid or a mixture of glycol and acetic acid in the ratio 1:1.

150 parts of the solution obtained is equivalent in the mass coloring of paper to 100 parts of powdered Rhodamine FB (C.I. 45,170) in color strength with the same purity of shade and a somewhat yellower tone.

I claim:

1. A stable highly concentrated solution of an esterified rhodamine dye of the formula (A)

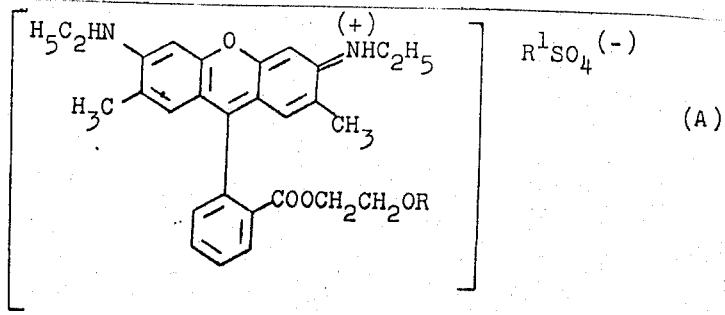

in which

R is hydrogen, acetyl, propionyl, alkyl of one to four carbon atoms or a radical of the formula $(CH_2CH_2O)_nR^2$;

$n$ is the integer 1 or 2;

$R^1$ is hydrogen, methyl or ethyl; and $R^2$ is hydrogen, acetyl, propionyl or alkyl of one to four carbon atoms.

2. A stable highly concentrated solution of esterified rhodamine dyes of the formulae (A) and (B)

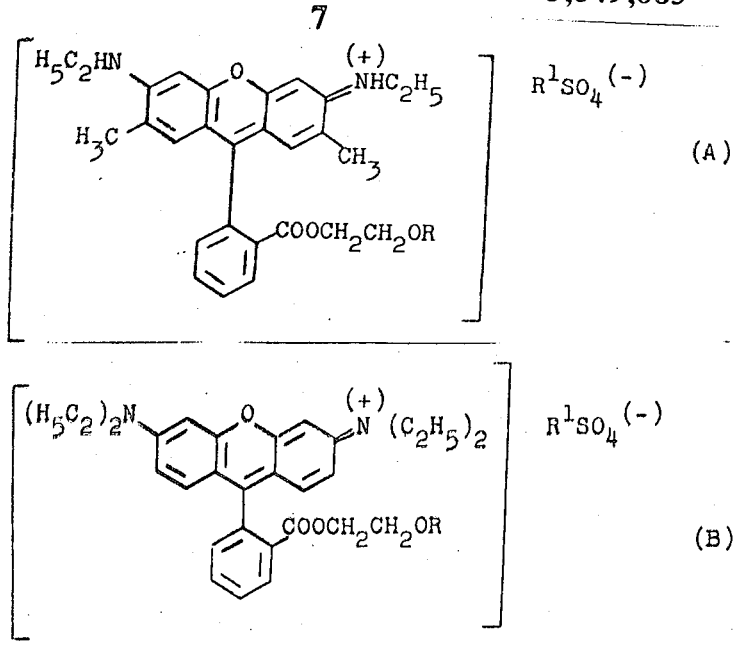
in which
R is hydrogen, acetyl, propionyl, alkyl of one to four carbon atoms or a radical of the formula $(CH_2CH_2O)_nR^2$;
$n$ is the integer 1 or 2;
$R^1$ is hydrogen methyl or ethyl; and
$R^2$ is hydrogen, acetyl, propionyl or alkyl of one to four carbon atoms, wherein the ratio of dyes (A) and (B) is from 40:60 and 60:40.
* * * * *

UNITED STATES PATENT AND TRADEMARK OFFICE
CERTIFICATE OF CORRECTION

PATENT NO. : 3,849,065
DATED : November 19, 1974
INVENTOR(S) : SCHMEIDL

It is certified that error appears in the above-identified patent and that said Letters Patent are hereby corrected as shown below:

```
In the Heading, insert -- [30] Foreign Application
Priority Data   July 30, 1971   Germany   P 21 38 178.2
and June 9, 1972   Germany   P 22 28 260.6 --
```

Signed and Sealed this

Twenty-seventh Day of July 1976

[SEAL]

Attest:

RUTH C. MASON
*Attesting Officer*

C. MARSHALL DANN
*Commissioner of Patents and Trademarks*